(12) United States Patent
Boyer

(10) Patent No.: US 10,384,812 B1
(45) Date of Patent: Aug. 20, 2019

(54) ION PLASMA REACTION DRIVE

(71) Applicant: Daniel Jeffrey Boyer, Los Angeles, CA (US)

(72) Inventor: Daniel Jeffrey Boyer, Los Angeles, CA (US)

( * ) Notice: Subject to any disclaimer, the term of this patent is extended or adjusted under 35 U.S.C. 154(b) by 448 days.

(21) Appl. No.: 15/386,648

(22) Filed: Dec. 21, 2016

(51) Int. Cl.
*B64G 1/40* (2006.01)
*H05H 1/54* (2006.01)

(52) U.S. Cl.
CPC .............. *B64G 1/405* (2013.01); *H05H 1/54* (2013.01)

(58) Field of Classification Search
CPC .......... B64G 1/40; B64G 1/405; B64G 1/409; H05H 1/54
See application file for complete search history.

(56) References Cited

U.S. PATENT DOCUMENTS

| | | | | |
|---|---|---|---|---|
| 4,047,068 A * | 9/1977 | Ress | .................. | G21B 1/00 313/161 |
| 2005/0056729 A1* | 3/2005 | Foster | .................. | B64G 1/409 244/171.1 |
| 2006/0027709 A1* | 2/2006 | Pinto | .................. | B64G 1/409 244/171.1 |
| 2007/0007393 A1* | 1/2007 | Pinto | .................. | B64G 1/409 244/171.5 |
| 2016/0079813 A1* | 3/2016 | Smith, Jr. | ............... | B64G 1/40 310/154.01 |
| 2018/0310393 A1* | 10/2018 | Castillo Acero | ...... | F03H 1/0056 |

* cited by examiner

*Primary Examiner* — Benjamin P Lee
(74) *Attorney, Agent, or Firm* — Plager Schack LLP; Mark H. Plager; Alexis J. Saenz

(57) ABSTRACT

An ion plasma reaction (IPR) drive system is disclosed which generates thrust by directionally accelerating relativistic velocity ion plasmas through closed loop magnetic confinement rings in order to interact more strongly with space-time. The IPR drive system provides an approach for the generation of continuous space vehicle acceleration without the need to eject on-board stored propellant. Charged particles are accelerated through a closed loop system up to velocities approaching the speed of light in such a manner that they strongly interact in an asymmetrical manner with space-time to generate continuous space vehicle acceleration. The supplemental means for electrical power generation and propulsive thrust augmentation are also disclosed.

8 Claims, 2 Drawing Sheets

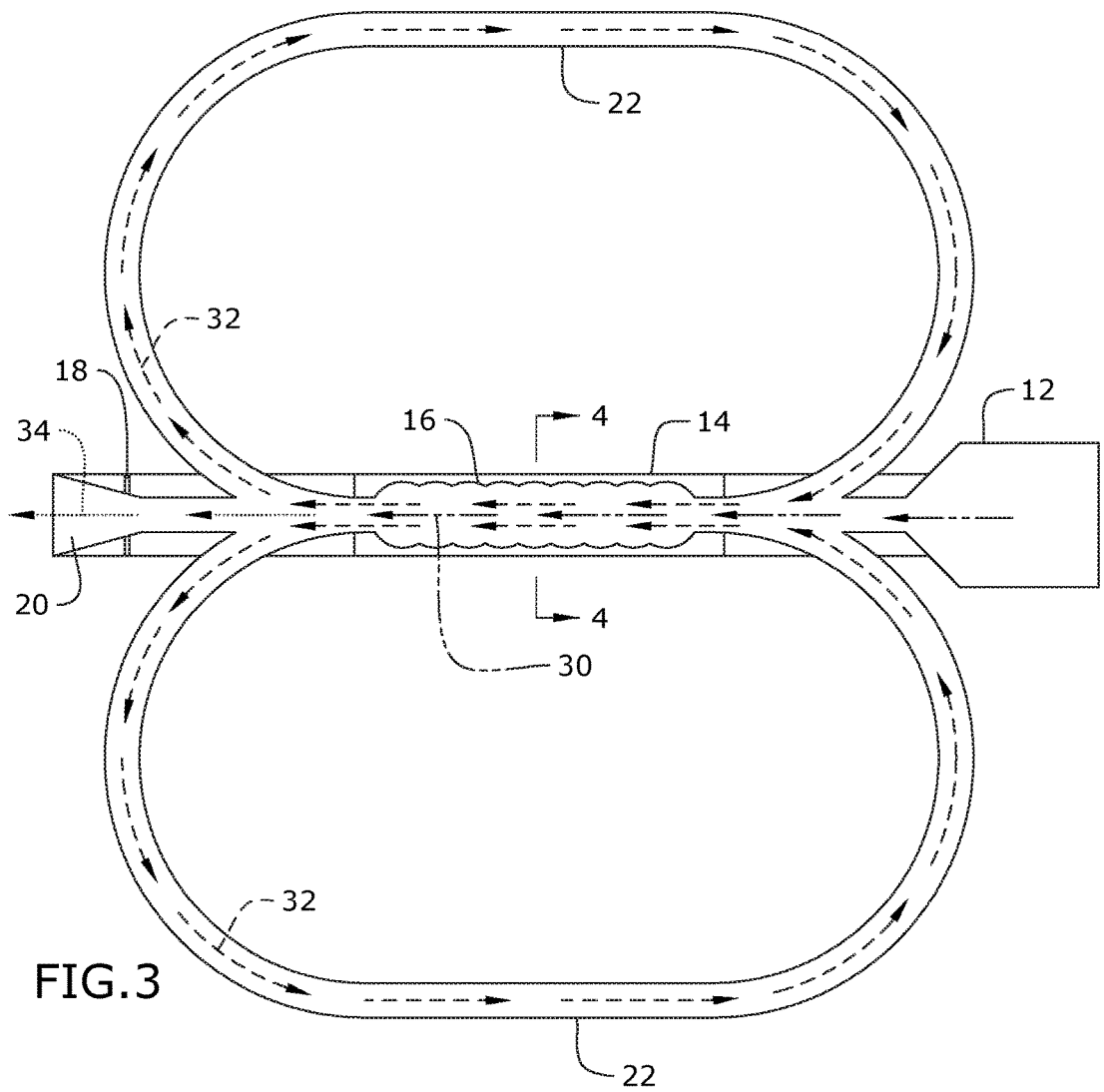
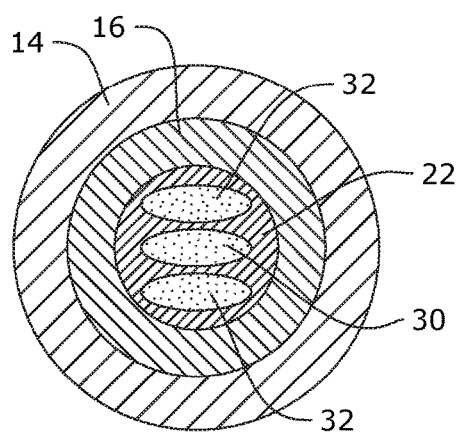
FIG.3
FIG.4

ION PLASMA REACTION DRIVE

BACKGROUND

The embodiments herein relate generally to propulsion systems and more particularly, to ion plasma reaction (IPR) drive.

Space vehicles currently rely on chemical or electric ion propulsion systems that eject propellant to generate thrust to accelerate the space vehicle forward. This approach limits the Space Vehicle acceleration and velocity due to the finite amount of propellant that is available for the generation of thrust and acceleration and once the propellant stored on the space vehicle is consumed, thrust can no longer be generated and space vehicle acceleration is discontinued. The limited propellant supply places a relatively low limit on the top velocity of the vehicle.

One current state of the art technology is known as the "EM Drive". The "EM Drive" is claimed to generate thrust without the ejection of propellant. As will be seen, the "EM drive" is limited to lower levels of thrust (compared to the proposed IPR drive disclosed below) because its design injects microwaves into a metallic conical enclosure. The microwaves bounce randomly around the interior surfaces of its conical enclosure, with the conical shape inducing an asymmetrical interaction between the microwaves and space-time. Several groups of investigators (including NASA subcontractor "EagleWorks") claim to have measured very low levels of thrust generated during operation of the EM drive. According to one paper, a mere 1.2 millinewtons of force per kilowatt of energy was produced. This does not appear to be sufficient for practical purposes of transporting vehicles in outer space.

As can be seen, there is a need for an improved propulsion system for viable space travel.

SUMMARY

In one aspect of the subject technology, an IPR drive system comprises a magnetic containment ring; an ion generation and injection system coupled to the magnetic containment ring and configured to generate streams of ionic particles into the magnetic containment ring; a magnetic compression system in a first section of the magnetic containment ring; and an ion acceleration system coupled to the magnetic compression system configured to accelerate the streams of ionic particles through the first section of the magnetic containment ring at a velocity faster than other sections of the magnetic containment ring to generate a propulsion force.

In another aspect, a space vehicle comprises a vehicle hull and an IPR drive system coupled to the vehicle hull to propel the space vehicle through space. The IPR drive system comprises a magnetic containment ring; an ion generation and injection system coupled to the magnetic containment ring and configured to generate streams of ionic particles into the magnetic containment ring; a magnetic compression system in a first section of the magnetic containment ring; and an ion acceleration system coupled to the magnetic compression system configured to accelerate the streams of ionic particles through the first section of the magnetic containment ring at a velocity faster than other sections of the magnetic containment ring to generate a propulsion force.

BRIEF DESCRIPTION OF THE FIGURES

The detailed description of some embodiments of the invention is made below with reference to the accompanying figures, wherein like numerals represent corresponding parts of the figures.

FIG. 3 is a top view of the IPR drive system of FIG. 1.

FIG. 4 is a cross-sectional view taken along the line 4-4 of FIG. 3.

DETAILED DESCRIPTION OF CERTAIN EMBODIMENTS

Referring to the Figures in general, broadly, embodiments of the disclosed invention provide an IPR drive system 10 which generates thrust by directionally accelerating relativistic velocity ion plasmas through closed loop magnetic confinement rings in order to interact more strongly with space-time. The IPR drive system 10 provides an approach for the generation of continuous space vehicle acceleration without the need to eject on-board stored propellant. Charged particles are accelerated through a closed loop system up to velocities approaching the speed of light in such a manner that they strongly interact in an asymmetrical manner with space-time to generate continuous space vehicle acceleration. Charged particles (for example protons and heavier ions) are directionally accelerated to relativistic velocity through closed loop magnetic containment rings and then compressed together inside a strong magnetic field in order to create a propulsive reaction force against space-time. As long as a vehicle using the IPR drive provides a supply of electrical power, this system will generate continuous acceleration resulting in increasingly high vehicle velocities. This approach removes the propellant supply limit as a constraint on continuous space vehicle acceleration, with the result being that the space vehicle velocity may approach a significant percent of the speed of light. The IPR drive system 10 will therefor generate higher levels of continuous thrust for space vehicle acceleration than is possible with the "EM Drive" and additionally provides thrust augmentation and supplemental electrical power generation capabilities.

Figure 1:
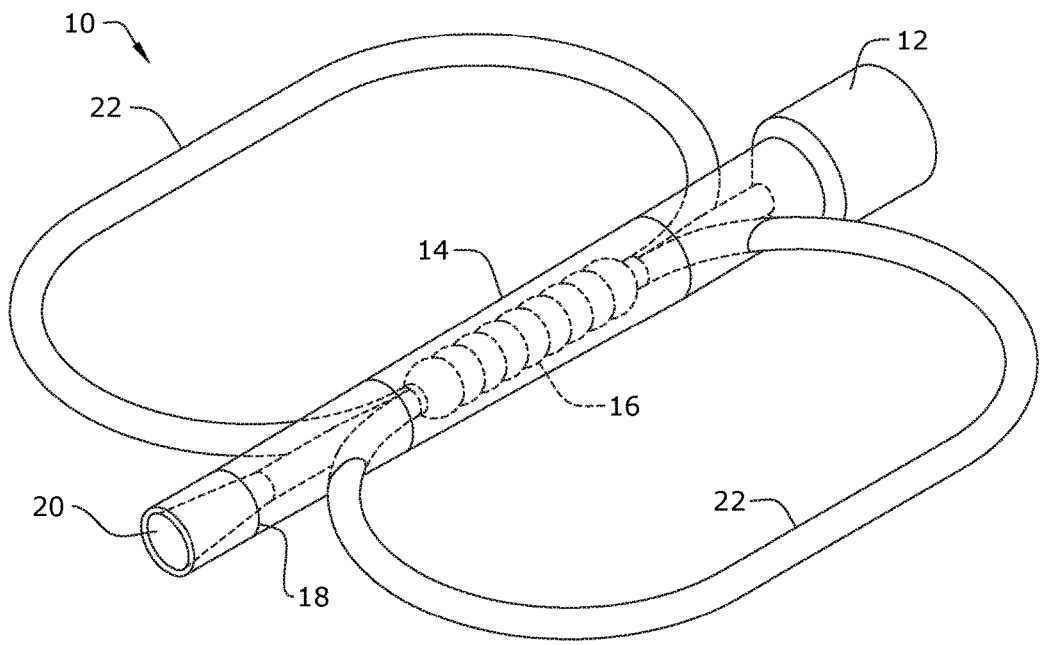
FIG. 1 is a perspective top view of a IPR drive system according to an exemplary embodiment.

Referring to FIGS. 1 and 3, the IPR drive system 10 is shown according to an exemplary embodiment. The IPR drive system 10 includes an ion generation and injection system 12 and a magnetic containment ring(s) 22. A section of the magnetic containment ring(s) 22 include a magnetic compression system 14 housing an ion acceleration system 16 for accelerating particles through that section of the ring(s) 22 faster than the rest of the sections of the magnetic containment ring(s) 22. For sake of illustration, magnets used in the magnetic containment ring(s) 22 are not shown but will be understood to be present as is known in the art of, for example synchrotrons. While a pair of rings 22 is shown, it will be understood that a single ring, a pair of rings, or three or more rings may be used without departing from the scope of the invention. The more rings 22 used, the more the amount of ions can be accelerated to increase the propulsive efficiency. In an alternate embodiment not shown, a vertical torus configuration may be used with the charged particles merging into a relativistic plasma stream continuously circulating around the inside of the torus containment vessel. The magnetic containment rings 22 may be elliptical. In embodiments using multiple containment rings 22, the rings 22 may circulate symmetrically from an axis defining the length of the magnetic compression system 14. A magnetic valve 18 and magnetic nozzle 20 may be coupled to an output end of the magnetic compression system 14 and controlled to release a propulsive reaction ion stream 34 and thus augment the thrust force produced by the IPR drive system 10.

In operation, the ion generation and injection system 12 generates charged particle streams which may include a proton ion beam 30 and an ion plasma stream 32. The ion plasma stream 32 is injected and then recursively accelerated to relativistic speeds by the ion acceleration system 16. Once generated, the relativistic ion plasma stream 32 is injected into the magnetic containment ring(s) 22 which in the exemplary embodiment shown includes two toroidal magnetic rings that continuously circulate the relativistic ion plasma streams 32 along a closed loop path. The proton ion beam 30 may be sent directly through the ion acceleration system 16 and out the nozzle 20 after being compressed between relativistic ion plasma streams 32 by the magnetic compression system 14 which causes the proton ion beam 30 and ion plasma stream 32 to interact and thus produce the propulsion reaction ion stream 34.

The ion acceleration system 16 may be integrated with the common center section of the magnetic containment ring(s) 22 and can utilize either an electrostatic potential gradient, magnetic oscillation, or laser excitation (among other methods) to provide the means to accelerate the ion plasma streams 32 to relativistic velocities (approximately >50% c, where c represents the speed of light). Following acceleration, the relativistic ion plasma stream(s) 32 coasts around the inside of the magnetic confinement ring 22 in a closed loop back to the start of the ion acceleration system 16 where the streams are re-accelerated. This closed loop is repeated continuously with the result that the ion plasma streams 32 reach relativistic velocities and interact asymmetrically with space-time when they are compressed together with the proton ion beam 30 inside of the magnetic compression system 14 to provide a propulsive reaction force for space vehicle acceleration. FIG. 4 shows a representation of the proton ion beam 30 compressed between adjacent ion plasma streams 32. The reaction force between the relativistic charged particles and space-time employed by the IPR drive system 10 may be considered analogous to the propulsive drive force that exists between an automobile tire and the surface of a road. Just as there is a reaction friction force between the tire and the road surface that allows an engine to propel the automobile forward, there is likewise a relativistic reaction force that exists between the relativistic velocity charged particles and space time that allows the IPR drive system 10 to generate a propulsive force. It is an established law of physics that physical objects with mass interact with space-time in an inertial manner that may be considered to be analogous to a frictional force with space-time.

Figure 2:
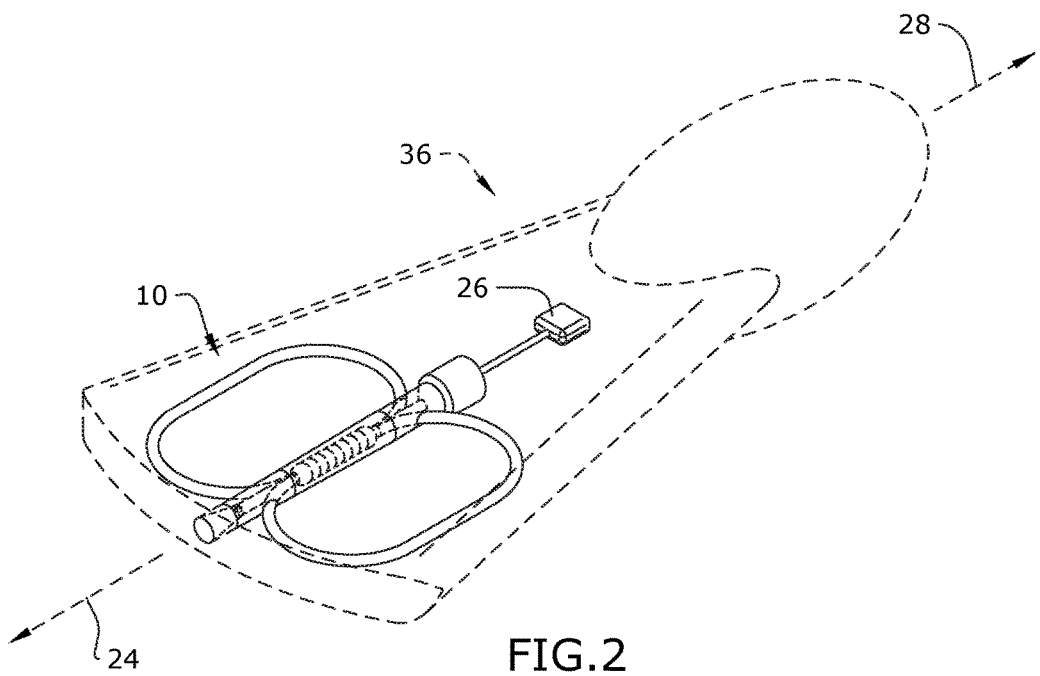
FIG. 2 is a perspective top view of a space vehicle system (shown in shadowed lines) including the IPR drive system of FIG. 1 according to an exemplary embodiment.

Referring now to FIGS. 2 and 3, the IPR drive system 10 is shown in use in an exemplary application. One application for the IPR drive system 10 is used within a vehicle 36 hull for space travel. The vehicle 36 may include an electrical power supply 26 which provides electrical power to IPR drive system 10 to enable its continuous operation. For example, the power supply 26 may power the ion generation and injection system 12, the magnets with the magnetic compression system 14, the ion acceleration system 16, and the magnets within the containment ring(s) 22. The proton ion beam 30 interaction with the ion plasma stream 32 enhances the space-time reaction force through nuclear reactions that are exhausted out of the magnetic valve 18 and magnetic nozzle 20 as the propulsion reaction ion stream 34 in order to enhance the IPR thrust vector 24 that results in supplemental augmentation of the space vehicle acceleration vector 28.

As may be appreciated, embodiments may collect surplus nuclear reactions between the ion plasma stream 32 and the proton beam 30 for use as a regenerated electrical power source that may be captured and supplied back to the space vehicle 36 in order to meet the electrical power demands of the IPR drive system 10.

The principle of generating propulsion from ion plasma reactions has been experimentally demonstrated at large physics facilities such as the CERN Large Hadron Collider (LHC). When the LHC is in operation it accelerates protons or lead ions to velocities that are close to the speed of light "c". However as the particles are accelerated closer to the speed of light (>99% c) an exponentially increasing amount of energy is required to further accelerate them closer to the speed of light. In fact, according to Albert Einstein's famous equation from the General Theory of Relativity, ($E=Mc^2$) tells us that an infinitely large amount of energy would be required to accelerate a particle of mass to the speed of light. This physical principle provides the proof that when electrons, protons or heavier ions, travel at speeds approaching the speed of light (relativistic velocity), they interact with space-time in such a manner that exhibits the characteristics of drag or friction with space-time that inhibits their continued acceleration up to the speed of light.

Aspects of the IPR drive system 10 exploit the experimentally demonstrated friction force between relativistic velocity particles and space-time to generate an asymmetrical interaction between the relativistic velocity charged particles and space-time in such a manner that a net propulsive force (represented by thrust vector 24) is generated. In the IPR drive system 10 closed cycle, a circular ring(s) of relativistic velocity charged particles interact with space-time in a manner that is simplistically similar to the manner in which an automobile tire asymmetrically interacts with the surface of the road through friction in order to generate a net propulsive force that accelerates the car forward. The closed cycle, relativistic velocity particle stream, traveling around inside of the magnetic containment ring generates an asymmetrical friction force with space-time by asymmetrically accelerating the particles closer to the speed of light only in the ion acceleration system 16 section of the particle containment ring 22 while particles outside of the ion acceleration system 16 section move slower than those in the ion acceleration system 16 section, which in turn generates a net reactive propulsive force.

The long term, continuous propulsive force provided by the IPR drive system 10 may allow for space vehicle acceleration to very high velocities which will enable the realization of much shorter travel times to various destinations in outer space. Shorter trip times may allow for lower overall costs and may also provide for improved health for astronauts as they will spend less time in the harsh space radiation environment. Another benefit of the IPR drive system 10 is that it eliminates the need to carry large, heavy loads of propellant, which would then allow for smaller less expensive space vehicles, or would allow for the inclusion of additional payload for use in completing mission objectives.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above. For example, the selection of the type of charged particles that will be accelerated inside of the magnetic containment ring may differ from what was described without departing from the scope. The simplest options are to utilize free electrons or protons for the charged particles. However it may be beneficial to utilized heavier charged particles such as lithium or boron ions. These heavier charged particles may interact more strongly with space-time in the particle acceleration section 16 in order to create a stronger asymmetrical reaction force for space vehicle propulsion. Additionally the selection of certain ion types may enable nuclear reactions with the proton beam 30 that could enable enhanced propulsive force through the propulsion reaction ion stream 34, and the generation of supplemental electrical power.

What is claimed is:

1. An ion plasma reaction (IPR) drive system, comprising:
a magnetic containment ring;
an ion generation and injection system coupled to the magnetic containment ring and configured to generate streams of ionic particles into the magnetic containment ring;
a magnetic compression system in a first section of the magnetic containment ring; and
an ion acceleration system coupled to the magnetic compression system configured to accelerate the streams of ionic particles through the first section of the magnetic containment ring at a velocity faster than other sections of the magnetic containment ring to generate a propulsion force.

2. The IPR drive system of claim 1, wherein the ionic particle streams generated by the ion generation and injection system include a proton ion beam and an ion plasma stream.

3. The IPR drive system of claim 2, wherein the proton ion beam is compressed between the ion plasma streams in the magnetic compression system.

4. The IPR drive system of claim 1, further comprising a magnetic valve controlled to release the propulsion reaction ion stream through a magnetic nozzle to augment the propulsion force.

5. A space vehicle, comprising:
a vehicle hull; and
an ion plasma reaction (IPR) drive system coupled to the vehicle hull to propel the space vehicle through space, the IPR drive system comprising,
a magnetic containment ring;
an ion generation and injection system coupled to the magnetic containment ring and configured to generate streams of ionic particles into the magnetic containment ring;
a magnetic compression system in a first section of the magnetic containment ring; and
an ion acceleration system coupled to the magnetic compression system configured to accelerate the streams of ionic particles through the first section of the magnetic containment ring at a velocity faster than other sections of the magnetic containment ring to generate a propulsion force.

6. The space vehicle of claim 5, further comprising a magnetic valve coupled to the ion acceleration system and controlled to release the propulsion force from the vehicle hull.

7. The space vehicle of claim 5, wherein the ionic particle streams generated by the ion generation and injection system include a proton ion beam and an ion plasma stream.

8. The space vehicle of claim 7, wherein the proton ion beam is compressed between the ion plasma streams in the magnetic compression system.

\* \* \* \* \*